Feb. 28, 1956

O. RASMUSSEN ET AL 2,736,396

BRAKE SLACK ADJUSTER

Original Filed Nov. 23, 1945

Inventors
Olaf Rasmussen &
Richard C. Rike

Willits, Helwig & Baillio
Attorneys

United States Patent Office 2,736,396
Patented Feb. 28, 1956

2,736,396

BRAKE SLACK ADJUSTER

Olaf Rasmussen, Port Clinton, and Richard C. Rike, Dayton, Ohio, assignors to General Motors Corporation, Detroit, Mich., a corporation of Delaware Original application November 23, 1945, Serial No. 630,226. Divided and this application June 4, 1951, Serial No. 229,836

5 Claims. (Cl. 188—196)

This invention relates to improvements in brakes and particularly hydraulically actuated brakes and is a division of the applicants' copending application Serial No. 630,226, filed November 23, 1945, which has matured into Patent No. 2,580,701.

It is among the objects of the present invention to provide an improved automatic slack adjuster for a brake.

A further object of the present invention is to provide an improved slack adjuster for a brake drum having a minimum expansion during operation so that temperature compensation mechanism will not be necessary.

In the standard brake, the drum, frictionally engaged by the brake shoes, becomes heated during braking operations and, due to said heating, will expand diametrically. Due to this enlargement of the drum, a greater brake shoe travel is required at the higher temperature of the drum than at the initial, normal temperature, this, therefore, requires the brake shoe actuating device to be adjusted to compensate for such expansion due to temperature increases in order to maintain the necessary braking effort.

The brake shoe actuator of the present invention is simplified because it need not be adjusted to compensate for expansion of the drum, but only for brake shoe wear. Simplification of the brake actuating device as well as the adjuster is rendered possible under the present invention, for the brake drum is of such a size or may be made of such a material as to limit its expansion due to temperature rises so as not to require adjustment for expansion. In the present invention, the brake drum is of such a size or is constructed of such a material as to have an expansion which does not exceed the effective operating range of movement of the brake shoe actuating device. Thus the normal travel of the actuating device is sufficient, in a predetermined range of drum expansion movements, to move the shoes into braking engagement with the drum without necessitating adjustment thereof to compensate for such drum expansion.

Further objects and advantages of the present invention will be apparent from the following description, reference being had to the accompanying drawings, wherein a preferred embodiment of the present invention is clearly shown.

The applicants' original application Serial No. 630,226, now Patent No. 2,580,701, contains a complete description of all the features of this brake. Since this application relates to the automatic slack adjuster, the other features are described only in conjunction with the description of the slack adjuster. The wheel hub is equipped with a drum 23 which is much smaller than the drum usually found on a wheel of corresponding size so that a relatively large air space between the wheel rim and the drum is available for cooling the drum. Specifically the drum is but about half the diameter of the drum usually found on wheels of the size intended to be used. The axle carries the anchor member 27 which serves the usual purpose of anchoring the shoes and supporting the applying means.

Figure 1:
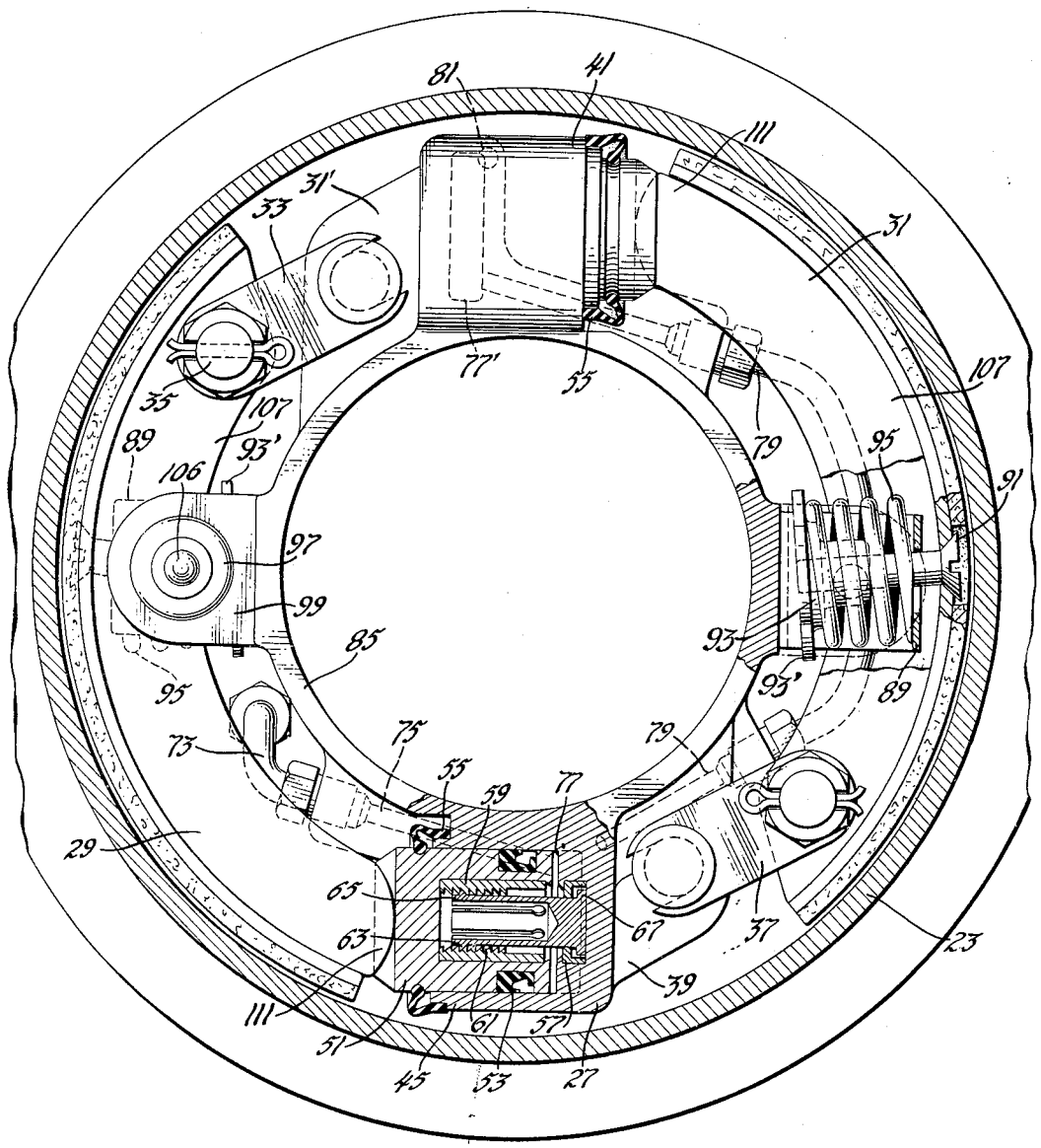
Figure 1 is a vertical section through the drum.

From Figure 1 it will be seen that the brake shoes are of the articulating link type. There are two shoes 29 and 31. Shoe 29 anchors on a part 31' of the anchor member 27 by the interposition of link means 33 pivoted near the end of the shoe at 35. Diametrically opposite link means 33 are other link means 37 which connect an end of shoe 31 to another anchor abutment 39.

Because of the relatively small diameter of the drum, it may be extended much more than usual in its axial dimension whereby there is a greater area of contact with wider shoes. Also we prefer to apply the brake shoes by hydraulic applying means and to provide greater effective action than could be provided by a single wheel cylinder within the restricted radial dimension available. Tandem cylinders may be employed as described in the applicants' above mentioned application. In this application only the single wheel cylinder 41 at the upper region of the anchor and 45 at the lower region is shown. Within each cylinder is a cup-shaped piston 51 having a channeled outer end engaging the rounded end of one of the adjacent brake shoe webs 111. The piston is sealed by packing 53 and a protecting boot 55 is used between the cylinder and its piston. In each cylinder there is added a slack adjuster to make correction for the released position of the shoes as the lining wears. To that end a slotted disc 57 is staked into the wheel cylinder adjacent its inner end. On the inner wall of the piston or on a sleeve 59 secured therein are teeth 61. Cooperating with teeth 61 are one or more teeth 63 on the arcuate segments of an inner sleeve 65. This last named sleeve has a neck part extending slidably through disc 57 and a head 67 located between the inner end of the cylinder and the staked disc. The resiliency of the arms of sleeve 65 holds the teeth in contact with each other. When the brake is applied the clearance between the head 67 and the disc 57 permits the sleeve 65 to move outwardly with the piston. Only if more than normal movement of the piston occurs does the tooth or teeth of sleeve 65 engage an adjacent tooth of the piston and determine a new release position. The space through which the head 67 is free to move accommodates normal shoe clearance and any expansion of the drum due to heat from friction with the shoes or deflection due to forces applied. It will be noted that since the drum is much smaller than usual it is possible to provide a clearance for head 67 which might not be practicable were the drum of a larger size which would have greater expansion or deflection. The number of teeth on the piston sleeve is limited so that after a given extent of slack adjustment is made, no more adjustment will occur. The operator is thus made aware of the need for relining.

The pressure fluid is supplied by a master cylinder to a conduit 73, and a connected passage 75 in the anchor to a space 77 at the back of the pistons of the lower pair of wheel cylinders, from which space a suitable conduit 79 conveys it to the space 77' at the back of the pistons associated with the upper cylinders. At the uppermost region a bleed passage 81 having a suitable closure permits the removal of the contents.

The retraction spring mechanism shown in Figure 1 is completely shown and described in the applicants' above mentioned application. To a flange 85 integral with the anchor plate 27 is secured a U-shaped member 89. The brake shoe carries a bolt 91 extending radially therefrom and into the hollow of the member 89 where it has a nut 93 with two opposed ears 93' (Figure 1) which project through the side openings of U-shaped member 89. Between the ears 93' of the nut and the arch of member 89 is a releasing spring 95. There may be two of these shoe releasing devices, one for the midportion of each shoe as illustrated. For the details of the lateral positioning means 106 mounted on the stamping 97, see the applicants' above mentioned application.

Figure 2:
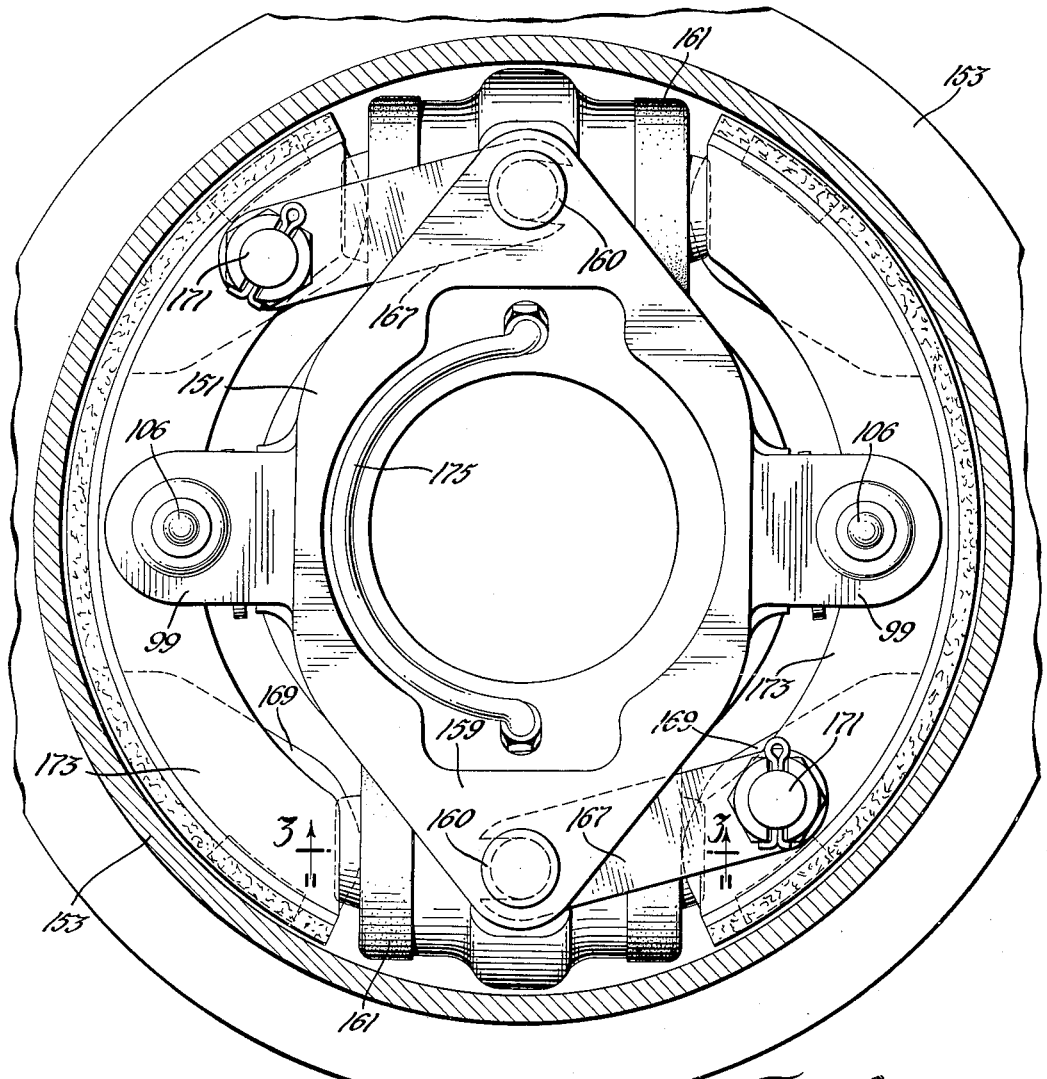
Figure 2 is a vertical section of a modification in which the invention may be embodied.
Figure 3:
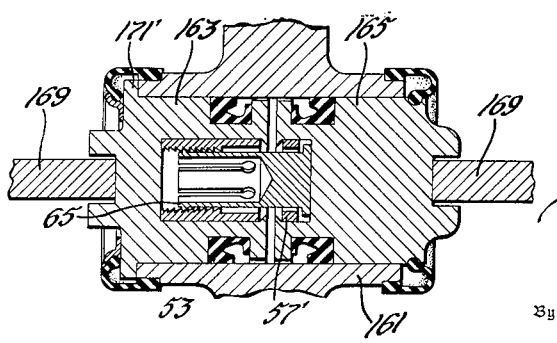
Figure 3 is a section on line 3—3 of Figure 2.

The brake mechanism thus far described is intended for use as a front wheel brake. It will be readily seen that the two shoes are self-energized by drum contact to give self-energized frictional retarding in one direction only of drum rotation. In checking reverse driving, this type of brake is relatively inefficient since the applied force in the case of both shoes acts against the braking forces produced by drum rotation. It is, however, an arrangement especially effective for checking forward travel and is believed to be desirable for front wheels. Rearward vehicle movement is slow and it is considered unnecessary to provide maximum braking on front wheels. This brake construction when employed on vehicles having standard wheels of 15 or 16 inches in diameter will produce the same retarding force with a brake drum of not more than seven inches in diameter as the conventional brake with a drum having a diameter of 11 to 14 inches. With the small brake drum of seven inches or less in diameter the normal temperature rise of about 600° F. will not expand the diameter of the drum more than .035 of an inch or the circumference more than .110 of an inch. When this expansion and distortion of the drum during brake application is reduced to this small value due to the small diameter drum, the lost motion of the stem or sleeve 65 mounted on the cylinder as shown in Figure 2 or on the other piston as shown in Figure 3 may be reduced. Thus the lost motion of stem 65 is made equal to the movement of the piston normally necessary to move the shoe into braking engagement with the drum at a given normal operation temperature, and then a distance of not more than .0505 of an inch to maintain said braking engagement for expansion and distortion of the small drum due to temperature rises during the braking. With this small seven-inch drum the small expansion does not require a noticeable increase in the lost motion required in the slack adjusted above the normal slack employed at constant normal temperatures to prevent the brake from binding due to the contraction of the drum onto the shoes.

In the application of this invention to rear wheels there will be described an arrangement wherein self-energization is provided for the shoes in their work of checking rearward as well as forward travel although that nicety of drum engagement by the shoes occasioned by the link anchorage is available only in the act of checking forward travel. It may be added that the arrangement for rear wheels could also be adopted for front wheels if it should be desired. In this second form the invention has been shown with single cylinders instead of with pairs of cylinders, it being believed that in many installations it will be entirely possible to apply the shoes without the duplication of wheel cylinders described above.

Considering then, Figures 2 and 3, numeral 151 is used to designate the shoe torque taking anchor. It is rigid with the axle housing as usual. The small brake drum 153 is carried by the wheel in any convenient way. The anchor closes the open end of the drum and has an annular part projecting over the axle bearing and into the hollow drum. Radially enlarged parts 159 are formed with cylinders 161 open at both ends within which are pistons 163 and 165 (Figure 3). Each anchor enlargement carries pins 160 on each side of the cylinder for the support of links 167 connected to the ends of one of the shoes. Intermediate reinforcements 169 at both ends of both shoes are engaged by the recessed ends of the pistons. One of the pistons of each pair is associated with a slack adjuster which, except for its supporting means in the other piston, is like that of the Figure 2. The provision for brake release and for holding the shoe away from the drum is like that shown by Figure 1 and need not be again described. At the link ends of the shoes are bolts or pins 171 carried in this case by shoe webs 173 and by reinforcement 169. A suitable conduit from the master cylinder is connected in any convenient manner to the space between the pistons of the lower wheel cylinder and the upper cylinder derives its source of fluid from a pipe 175 leading from the lower cylinder.

With this arrangement, forward vehicle travel is to be understood as causing clockwise rotation of the drum shown in Figure 2. The lower left piston applies the left shoe which anchors by means of its link 167. At the same time the upper right piston applies the right shoe anchoring by means of its links. The nice fit with the drum because of the links and self-energization caused by drum rotation supplementing the applied force makes this a very effective brake. For reverse travel the right lower piston pushes the righ shoe, the adjacent link leaving its anchor pin and similarly the left upper piston applies the left shoe. The drum rotation thus aids the hydraulic application for checking reverse as well as forward travel. It will be seen that a shoulder 171' on the piston anchors on the cylinder end in the case of reverse travel.

While the embodiment of the present invention as herein disclosed, constitutes a preferred form, it is to be understood that other forms might be adopted, all coming within the scope of the claims which follow.

We claim:

1. A slack adjuster for hydraulic brakes including a wheel cylinder, a hollow piston within said cylinder, a limited number of teeth projecting inwardly within said piston, a tubular adjusting pin having a slotted wall and a head, means in the cylinder to provide limited free movement for said head, said slotted wall having one or more formations extending outwardly to engage said piston teeth to determine progressive positions of brake release to correspond with lining wear.

2. The invention defined by claim 1, said limited number of teeth on said piston limiting extension of said wheel cylinder and terminating automatic adjustment before the shoe lining is fully worn.

3. The invention defined by claim 1, said cylinder having a second opposed piston and said means to afford limited free movement for said pin head being in said second piston.

4. A slack adjuster for hydraulic brakes including a wheel cylinder having an end wall and a shoulder adjacent said end wall, a hollow piston within said cylinder having an inner wall, a limited number of teeth projecting from said inner wall of said hollow piston, an adjusting member positioned within said hollow piston, said adjusting member having a head at one end located between said end wall and said shoulder and having limited movement, and said adjusting member having one or more formations to engage said piston teeth to determine progressive positions of brake release to correspond with lining wear.

5. In a slack adjuster for hydraulic brakes, a wheel cylinder including a member and a piston having an internal cavity at one end with an internal wall, said piston being movable relative to said member by fluid pressure contacting said one end and entering said cavity, ratchet teeth on said internal wall projecting inwardly within said hollow piston, a tubular adjusting pin having a slotted resilient wall extending over a portion of the tube adjacent one end positioned within said hollow piston, said slotted wall having a projection adjacent said one end to engage said ratchet teeth to permit relative movement of said member and piston in one direction and to prevent relative movement in the other direction, and means engaging the other end of said tubular adjusting pin to mount the pin on said member for limited free axial movement.

References Cited in the file of this patent

UNITED STATES PATENTS

| | | |
|---|---|---|
| 1,668,730 | Pearson | May 8, 1928 |
| 2,404,326 | Taylor | July 16, 1946 |

FOREIGN PATENTS

| | | |
|---|---|---|
| 730,210 | France | May 9, 1932 |